(12) United States Patent
Inoue et al.

(10) Patent No.: US 8,226,748 B2
(45) Date of Patent: Jul. 24, 2012

(54) $CO_2$ OR $H_2S$ REDUCING SYSTEM AND METHOD OF REDUCING $CO_2$ OR $H_2S$

(75) Inventors: Yukihiko Inoue, Kanagawa (JP); Ryuji Yoshiyama, Hiroshima (JP); Tsuyoshi Oishi, Hiroshima (JP); Masaki Iijima, Hiroshima (JP); Masazumi Tanoura, Kanagawa (JP); Tomio Mimura, Hyogo (JP); Kouki Ogura, Hyogo (JP); Yasuyuki Yagi, Hyogo (JP)

(73) Assignees: Mitsubishi Heavy Industries, Ltd., Tokyo (JP); The Kansai Electric Power Co., Inc., Osaka-shi, Osaka (JP)

( * ) Notice: Subject to any disclaimer, the term of this patent is extended or adjusted under 35 U.S.C. 154(b) by 232 days.

(21) Appl. No.: 12/602,887

(22) PCT Filed: Jun. 17, 2008

(86) PCT No.: PCT/JP2008/061052
§ 371 (c)(1),
(2), (4) Date: Dec. 3, 2009

(87) PCT Pub. No.: WO2008/156084
PCT Pub. Date: Dec. 24, 2008

(65) Prior Publication Data
US 2010/0170396 A1 Jul. 8, 2010

(30) Foreign Application Priority Data
Jun. 18, 2007 (JP) .................................. 2007-160658

(51) Int. Cl.
*B01D 53/14* (2006.01)
(52) U.S. Cl. .................. 95/181; 95/183; 95/199; 95/227; 95/229; 95/235; 95/236; 96/242
(58) Field of Classification Search ............ 95/178–179, 95/223, 227–229, 181–182, 235–236; 96/242; 423/228–229, 220
See application file for complete search history.

(56) References Cited

U.S. PATENT DOCUMENTS
3,563,695 A * 2/1971 Bensen ...................... 423/223
(Continued)

FOREIGN PATENT DOCUMENTS
EP 1736231 A1 12/2006
(Continued)

OTHER PUBLICATIONS
International Search Report of PCT/JP2008/061052, mailing date of Oct. 7, 2008.
(Continued)

*Primary Examiner* — Duane Smith
*Assistant Examiner* — Ives Wu
(74) *Attorney, Agent, or Firm* — Westerman, Hattori, Daniels & Adrian, LLP

(57) ABSTRACT

A $CO_2$ reducing system (10A) is constituted by a low-temperature $CO_2$ reducing apparatus (11-1) that includes a low-temperature absorber (1006-1) that reduces at least one of $CO_2$ and $H_2S$ by bringing flue gas (1002) including at least one of $CO_2$ and $H_2S$ into contact with a low-temperature absorbing solution (1005-1), a low-temperature regenerator (1008-1) that regenerates a low-temperature rich solution (1007-1), a low-temperature rich-solution supply line (12-1) that feeds the low-temperature rich solution (1007-1) to the low-temperature regenerator (1008-1), and a low-temperature lean-solution supply line (13-1) that feeds a low-temperature lean solution (1009-1) to the low-temperature absorber (1006-1) from the low-temperature regenerator (1008-1); and a high-temperature $CO_2$ reducing apparatus (11-2) that is arranged on a side at which the flue gas (1002) is discharged, and that has the same configuration as the low-temperature $CO_2$ reducing apparatus (11-1).

8 Claims, 8 Drawing Sheets

U.S. PATENT DOCUMENTS

| | | | |
|---|---|---|---|
| 3,877,893 A * | 4/1975 | Sweny et al. | 95/162 |
| 4,242,108 A * | 12/1980 | Nicholas et al. | 95/166 |
| 6,517,801 B2 * | 2/2003 | Watson et al. | 423/574.1 |
| 6,645,446 B1 * | 11/2003 | Won et al. | 423/210 |
| 6,800,120 B1 | 10/2004 | Won et al. | |
| 7,083,662 B2 * | 8/2006 | Xu et al. | 95/165 |
| 2004/0253159 A1 | 12/2004 | Hakka et al. | |
| 2007/0283813 A1 * | 12/2007 | Iijima et al. | 96/235 |
| 2009/0158930 A1 * | 6/2009 | Wagner et al. | 95/179 |

FOREIGN PATENT DOCUMENTS

| | | |
|---|---|---|
| GB | 867574 A | 5/1961 |
| GB | 1169175 A | 10/1969 |
| GB | 1255201 A | 12/1971 |
| JP | 43-19844 B1 | 8/1968 |
| JP | 44-18728 B1 | 8/1969 |
| JP | 48-10712 B1 | 4/1973 |
| JP | 55-082189 A | 6/1980 |
| JP | 56-067525 A | 6/1981 |
| JP | 6-000330 A | 1/1994 |
| JP | 07-051537 A | 2/1995 |
| JP | 2001-025627 A | 1/2001 |
| JP | 2005-254212 A | 9/2005 |
| JP | 2007-061777 A | 3/2007 |
| RU | 2080908 C1 | 6/1997 |
| RU | 2275231 C2 | 4/2006 |
| SU | 1725988 A1 | 4/1992 |

OTHER PUBLICATIONS

Russian Office Action dated Dec. 24, 200, issued in corresponding Russian Patent Application No. 2010101219/05.

Official Decision of Grant a Patent for an Invention dated Oct. 11, 2011, issued in corresponding Russian Patent Application No. 2010101219.

Supplementary European Search Report date Jun. 1, 2011, issued in corresponding European Patent Application No. 08765685.6.

Kohl, Arthur L. et al.; "Gas Purification, Fifth Edition, Chapter 14: Physical Solvents for Acid Gas Removal"; 1997, Gulf Publishing Company, Houston, Texas, XP002635040, pp. 1202-1210.(cited in European Search Report date Jun. 1, 2011).

Russian Office Action dated May 11, 2011, issued in corresponding Russian Patent Application No. 2010101219.

Japanese Office Action issued in corresponding Japanese Patent Application No. 2007-160658, mailing date Mar. 6, 2012.

Notice of Allowance in the Canadian Patent Application No. 2,693,065, dated Mar. 20, 2012.

* cited by examiner

$CO_2$ OR $H_2S$ REDUCING SYSTEM AND METHOD OF REDUCING $CO_2$ OR $H_2S$

TECHNICAL FIELD

The present invention relates to a $CO_2$ or $H_2S$ reducing system and a method of reducing the same using an absorbing solution that reduces $CO_2$ or $H_2S$, or both included in flue gas.

BACKGROUND ART

Recently, the greenhouse effect by $CO_2$ has been pointed out as one of the causes of the global warming, and countermeasures against the problem have become urgent global necessity to protect the global environment. An emission source of $CO_2$ is present in various fields of human activity in which fossil fuel is burned, and there is a tendency to further increase demand for suppression of the emission. Under such circumstances, intensive research on a feedstock (chemical purpose) such as urea, a boost in oil production, and a method of reducing and collecting $CO_2$ in flue gas, and of storing collected $CO_2$ without releasing it into the atmosphere by bringing the combustion flue gas from a boiler into contact with amine $CO_2$ absorbing solution in a power generation facility in a thermal power plant and the like in which a large amount of fossil fuel is used, as a countermeasure to the global warming has been conducted.

As a practical method of collecting and storing $CO_2$ in a large amount of combustion flue gas, a chemical absorption method in which the flue gas is brought into contact with $CO_2$ absorbing solution such as an amine solution has been available. As a process of reducing and collecting $CO_2$ from combustion flue gas using the $CO_2$ absorbing solution, a process of bringing the combustion flue gas into contact with the $CO_2$ absorbing solution in an absorber, and heating the absorbing solution that has absorbed $CO_2$ in a regenerator to release $CO_2$ and to regenerate the absorbing solution, and circulating the absorbing solution into the absorber again to be reused have been adopted (Patent Document 1).

In an operation of this conventional $CO_2$ collecting apparatus using the chemical absorption method, the amine solution and $CO_2$ are separated by high-temperature steam or the like, and the consumption of this steam (energy) has been required to be minimized. Therefore, a method of using two or more kinds of different $CO_2$ absorbing solutions mixed (Patent Documents 2 and 3) and a method of improving a process of feeding an $CO_2$ absorbing solution (Patent Document 4) have been considered.

FIG. 8 depicts a concept of a $CO_2$ or $H_2S$ reducing apparatus in which the method of using two kinds of absorbing solutions mixed is adopted. As shown in FIG. 8, the conventional $CO_2$ or $H_2S$ reducing apparatus 1000 includes a cooling column 1004 that cools an flue gas 1002 that includes $CO_2$ and that is emitted from an industrial facility 1001 such as a boiler and a gas turbine with a cooling water 1003, an absorber 1006 that reduces $CO_2$ from the flue gas 1002 by bringing the flue gas 1002 including cooled $CO_2$ into contact with an absorbing solution 1005 that absorbs one or both of $CO_2$ or $H_2S$, and a regenerator 1008 that regenerates the absorbing solution 1005 by releasing $CO_2$ from a $CO_2$ absorbed solution (rich solution) 1007 that has absorbed $CO_2$. In this apparatus, a regenerated absorbing solution (lean solution) 1009 from which $CO_2$ has been reduced in the regenerator 1008 is reused as an absorbing solution. Moreover, high-reaction-speed amine 1043, water 1044, and low-reaction-speed amine 1045 are supplied to the lean solution 1009 as necessary from three storage tanks 1040, 1041, and 1042, respectively.

In the $CO_2$ collecting method using this conventional $CO_2$ collecting apparatus, the flue gas 1002 including $CO_2$ is first pressured up by a flue gas blower 1010, and then, sent to the cooling column 1004 and is cooled by the cooling water 1003 to be sent to the $CO_2$ absorber 1006.

In the $CO_2$ absorber 1006, the flue gas 1002 countercurrent-contacts the alkanolamine-based absorbing solution 1005, $CO_2$ in the flue gas 1002 is absorbed by the absorbing solution 1005 by a chemical reaction ($R-NH_2+H_2O+CO_2 \rightarrow R-NH_3HCO_3$), and flue gas 1011 from which $CO_2$ has been reduced is released to the outside of the system. The absorbing solution 1007 that has absorbed $CO_2$ is also called "rich solution". This rich solution 1007 is pressured up by a rich solution pump 1012, and is heated, in a rich/lean-solution heat exchanger 1013, by the absorbing solution (lean solution) 1009 that has been regenerated by reducing $CO_2$ in the regenerator 1008, to be supplied to the regenerator 1008.

The rich solution 1007 discharged from an upper portion of the regenerator 1008 to the inside of the regenerator 1008 causes an endothermic reaction to release most of $CO_2$. The absorbing solution that has released a part or most of $CO_2$ in the regenerator 1008 is called "semi-lean solution". This semi-lean solution becomes the regenerated absorbing solution 1009 from which $CO_2$ has been removed substantially entirely by the time the semi-lean solution 1008 reaches a lower portion of the regenerator 1008. This absorbing solution regenerated by removing almost entire $CO_2$ is called "lean solution". This lean solution 1009 is heated by saturated steam 1030 in a regeneration heater 1014. On the other hand, from a top portion of the regenerator 1008, a $CO_2$ gas 1015 combined with water vapor that has been released from the rich solution 1007 and the semi-lean solution in the regenerator 1008 is guided out. In a condenser 1016, the water vapor is condensed, water is separated in a separation drum 1017, and a $CO_2$ gas 1018 is released to the outside of the system to be collected. Water separated in the separation drum 1017 is supplied to the upper portion of the regenerator 1008 by a condensed-water circular pump 1019. The regenerated absorbing solution (lean solution) 1009 is cooled in the rich/lean-solution heat exchanger 1013, with the rich solution 1007, is subsequently pressured up by a lean solution pump 1020, and is further cooled down by a lean solution cooler 1021, and then supplied to the absorber 1006 again, to be reused as an absorbing solution.

Reference numeral 1001a refers to a flue of the industrial facility 1001 such as a boiler and a gas turbine, reference numeral 1001b refers to a stack, and reference numeral 1031 refers steam after heat exchange. The $CO_2$ or $H_2S$ reducing apparatus can be retrofitted to collect $CO_2$ from an existing source of the flue gas 1002, and can be installed at the same time as the installation of a new source of the flue gas 1002. To the stack 1001b, an openable/closable door is provided, and is closed when the $CO_2$ or $H_2S$ reducing apparatus is operating. Moreover, it is set such that the door is open when the source of the flue gas 1002 is activated but the operation of the $CO_2$ or $H_2S$ reducing apparatus is stopped.

Patent Document 1: Japanese Patent Application Laid-open No. H7-51537
Patent Document 2: Japanese Patent Application Laid-open No. 2001-25627
Patent Document 3: Japanese Patent Application Laid-open No. 2005-254212
Patent Document 4: U.S. Pat. No. 6,800,120

DISCLOSURE OF INVENTION

Problem to be Solved by the Invention

The absorbing solutions differ in $CO_2$ or $H_2S$ absorption, dissipation properties depending on a temperature, so that an absorbing solution may be prone to dissipate but less prone to absorb $CO_2$ or $H_2S$, an absorbing solution may be, on the contrary, less prone to dissipate $CO_2$ or $H_2S$, but prone to absorb $CO_2$, $H_2S$, and the like.

Therefore, in the method in which two or more different absorbing solutions mixed are use, when the absorption temperature in the absorber is, for example, 40° C. and the regeneration temperature in the regenerator is, for example, 90° C., an absorbing solution that is less prone to absorb $CO_2$ or $H_2S$ at a low temperature, for example, exerts high $CO_2$ or $H_2S$ absorption property in the absorber but exerts low $CO_2$ or $H_2S$ dissipation property in the regenerator, and on the other hand, an absorbing solution that is prone to absorb $CO_2$ or $H_2S$ at a high temperature exerts low $CO_2$ or $H_2S$ absorption property in the absorber but exerts high $CO_2$ or $H_2S$ dissipation property in the regenerator. Accordingly, it is difficult to satisfy both the absorption and dissipation of $CO_2$ or $H_2S$ of a plurality of different absorbing solutions, and a problem that the efficiency of the system as a whole is low arises.

Further, in the method in which the process of feeding an absorbing solution is improved, it is important to achieve heat exchange of the absorbing solution with the maximum effectiveness in a range of 40° C. to 120° C. in order to conserve energy in a system.

The present invention has been achieved in view of the above problems, and an object of the present invention is to provide a $CO_2$ or $H_2S$ reducing system and a method in which the $CO_2$ or $H_2S$ absorption efficiency is further improved using a plurality of different absorbing solutions.

Means for Solving Problem

According to an aspect of the present invention, a $CO_2$ or $H_2S$ reducing system comprises at least two $CO_2$ or $H_2S$ reducing apparatuses each of which includes an absorber that reduces at least one of $CO_2$ and $H_2S$ by bringing a provided flue gas including at least one of $CO_2$ and $H_2S$ into contact with an absorbing solution, a regenerator that regenerates a rich solution that has absorbed at least one of $CO_2$ and $H_2S$, a rich-solution supply line that feeds the rich solution from the absorber to the regenerator, and a lean-solution supply line that feeds a lean solution from which at least one of $CO_2$ and $H_2S$ are reduced in the regenerator, from the regenerator to the absorber, wherein the absorbing solution absorbs at least one of $CO_2$ and $H_2S$ and is regenerated depending on a temperature of the absorbing solution, different kinds of absorbing solutions are provided independently to the respective $CO_2$ or $H_2S$ reducing apparatuses, and the flue gas is fed continuously in an order of a low-temperature absorbing solution on a low temperature side to a high-temperature absorbing solution on a high temperature side out of the different kinds of absorbing solutions Advantageously, the $CO_2$ or $H_2S$ reducing system further comprises a cooling-water supply-line facility that supplies a cooling water to cool the respective lean solutions, wherein out of lean solutions that are supplied from the regenerator to the absorber, a lean solution having a high temperature is arranged at an upstream side and a lean solution having a low temperature is arranged on a downstream side.

Advantageously, the $CO_2$ or $H_2S$ reducing system further comprises a saturated-steam supply-line facility that supplies saturated steam to warm the respective lean solutions, wherein out of lean solutions that are supplied from the regenerator to the absorber, a lean solution having a high temperature is arranged at an upstream side and a lean solution having a low temperature is arranged at a downstream side.

Advantageously, the $CO_2$ or $H_2S$ reducing system further comprises at least two heat exchanger that perform heat exchange between the lean solution and the rich solution, the lean solution and the rich solution circulating in an identical apparatus or in different apparatuses out of the $CO_2$ or $H_2S$ reducing apparatuses.

Advantageously, the $CO_2$ or $H_2S$ reducing system further comprises at least one semi-lean-solution heat exchanger that is interposed in the lean-solution supply line and that warms a semi-lean solution that is extracted from middle of the regenerator, and from which a part of at least one of $CO_2$ and $H_2S$ is removed, with the lean solution that is discharged from the regenerator.

According to a further aspect of the present invention, in a method of reducing $CO_2$ or $H_2S$, flue gas including at least one of $CO_2$ and $H_2S$ is fed to a low-temperature absorber, to which a low-temperature absorbing solution on a low-temperature side out of a plurality of different kinds of absorbing solutions is provided, to reduce at least one of $CO_2$ and $H_2S$ in the flue gas by the low-temperature absorbing solution, and then the flue gas is continuously fed to a high-temperature absorber, to which a high-temperature absorbing solution on a high-temperature side is provided, to further reduce at least one of $CO_2$ and $H_2S$ in the flue gas that has not been removed by the low-temperature absorbing solution, with the high-temperature absorbing solution.

Advantageously, in the method of reducing $CO_2$ or $H_2S$, the low-temperature absorbing solution that is provided to the low-temperature absorber is cooled by a cooling water, to reduce at least one of $CO_2$ and $H_2S$ in the flue gas by the cooled low-temperature absorbing solution, and then the high-temperature absorbing solution that is provided to the high-temperature absorber is further cooled using the cooling water that has been heat exchanged with the low-temperature absorbing solution, to further reduce at least one of $CO_2$ and $H_2S$ that has not been removed by the low-temperature absorbing solution, with the high-temperature absorbing solution.

Advantageously, in the method of reducing $CO_2$ or $H_2S$, a high-temperature lean solution that is collected near a bottom of a high-temperature regenerator that regenerates a high-temperature rich solution that has absorbed at least one of $CO_2$ and $H_2S$ in the high-temperature absorber is extracted to outside to be heat exchanged with saturated steam, and the warmed high-temperature lean solution is fed to the high-temperature absorber as a high-temperature absorbing solution, a low-temperature lean solution that is collected near a bottom of a low-temperature regenerator is extracted to outside to be heat exchanged with the saturated steam that has been heat exchanged with the high-temperature lean solution, and the warmed low-temperature lean solution is fed to the low-temperature absorber as a low-temperature absorbing solution, and at least one of $CO_2$ and $H_2S$ in the flue gas are reduced by the low-temperature absorbing solution, and at least one of $CO_2$ and $H_2S$ that has not been removed by the low-temperature absorbing solution is further reduced by the high-temperature absorbing solution.

Advantageously, in the method of reducing $CO_2$ or $H_2S$, the lean solutions that are discharged from the respective regenerators are heat exchanged using at least one of the rich solutions circulating in an identical apparatus or a different apparatus out of the $CO_2$ or $H_2S$ reducing apparatuses, and the heat exchanged lean solutions are provided to the respective absorbers to reduce at least one of $CO_2$ and $H_2S$ in the flue gas.

Advantageously, in the method of reducing $CO_2$ or $H_2S$, after heat exchanging a semi-lean solution that is extracted from middle of the regenerator and from which a part of $CO_2$ is removed with the lean solution that is discharged from the regenerator, the lean solution is provided to the absorber to reduce at least one of $CO_2$ and $H_2S$ in the flue gas.

EFFECT OF THE INVENTION

According to the present invention, by independently supplying different kinds of absorbing solutions for the respective $CO_2$ or $H_2S$ reducing apparatuses, and by continuously feeding the flue gas in the order of the low-temperature absorber to the high-temperature absorber out of the different kinds of absorbing solutions, $CO_2$ or $H_2S$ in the flue gas can be efficiently reduced corresponding to temperature dependency of absorption and dissipation of $CO_2$ or $H_2S$ of the respective absorbing solutions, and this is suitable for the $CO_2$ or $H_2S$ reducing system and the method in which $CO_2$ or $H_2S$ absorption efficiency is further improved.

EXPLANATIONS OF LETTERS OR NUMERALS 10A to 10D $CO_2$ reducing system
11-1 low-temperature $CO_2$-reducing apparatus
11-2 high-temperature $CO_2$-reducing apparatus
12-1 low-temperature rich-solution supply line
12-2 high-temperature rich-solution supply line
13-1 low-temperature lean-solution supply line
13-2 high-temperature lean-solution supply line
14 cooling water
15 cooling-water supply line
16 saturated-steam supply line
20-1 low-temperature semi-lean solution
20-2 high-temperature semi-lean solution
1002 flue gas
1005-1 low-temperature absorbing solution
1005-2 high-temperature absorbing solution
1006-1 low-temperature absorber
1006-2 high-temperature absorber
1007-1 low-temperature rich solution
1007-2 high-temperature rich solution
1008-1 low-temperature regenerator
1008-2 high-temperature regenerator
1009-1 low-temperature lean solution
1009-2 high-temperature lean solution
1021-1, 1021-2, 1021-3, 1021-4 cooler
1014-1 low-temperature regeneration heater
1014-2 high-temperature regeneration heater

BEST MODE(S) FOR CARRYING OUT THE INVENTION

The present invention will be explained below in detail with reference to the accompanying drawings. The present invention is not limited to the embodiments and examples. In addition, constituent elements in the embodiments and examples include those that can be easily assumed by those skilled in the art or that are substantially equivalent.

[First Embodiment]

A $CO_2$ reducing system according to a first embodiment of the present invention is explained with reference to the drawings.

Figure 1:
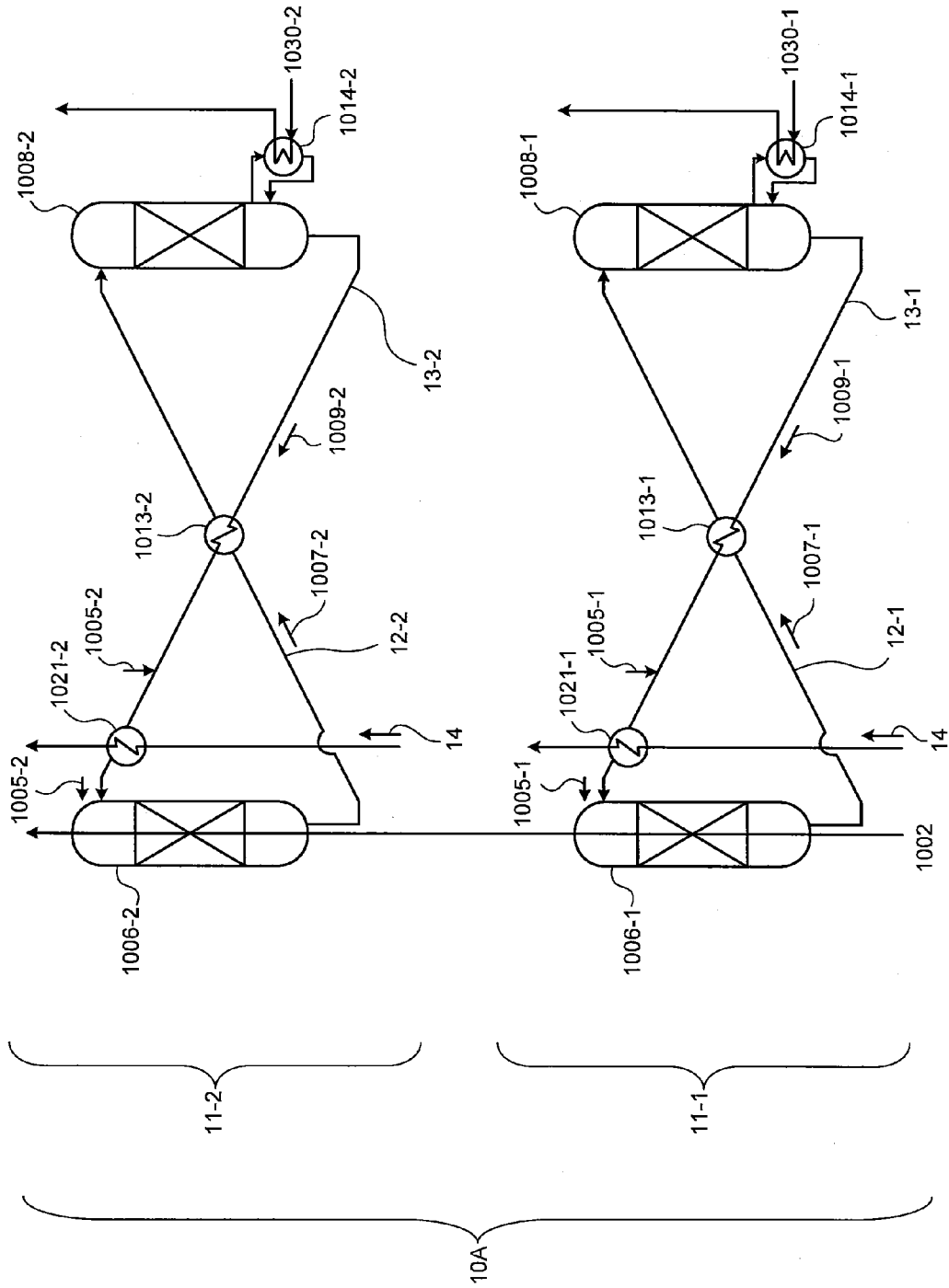
FIG. 1 is a schematic diagram showing a $CO_2$ reducing system according to a first embodiment of the present invention in a simplified manner.

FIG. 1 is a schematic diagram showing a $CO_2$ reducing system according to the embodiment of the present invention in a simplified manner. The $CO_2$ reducing system according the present embodiment has a substantially same configuration as the $CO_2$ or $H_2S$ reducing system shown in FIG. 8, and therefore, it is shown in a simplified manner and like reference numerals refer to like parts to those of the $CO_2$ or $H_2S$ reducing system in FIG. 8 and duplicated explanations thereof will be omitted.

Although the present invention is a $CO_2$ or $H_2S$ reducing system having a reducing apparatus that absorbs $CO_2$ or $H_2S$, in the present embodiment, a case of reducing only $CO_2$ is explained.

As shown in FIG. 1, a $CO_2$ reducing system 10A according to the present embodiment is constituted by a low-temperature $CO_2$-reducing apparatus 11-1 that is provided on a side at which flue gas 1002 is taken in, and a high-temperature $CO_2$-reducing apparatus 11-2 that is provided on a side at which the flue gas 1002 is discharged out. The low-temperature $CO_2$-reducing apparatus 11-1 is constituted by a low-temperature absorber 1006-1 that reduces $CO_2$ by bringing the provided flue gas 1002 including $CO_2$ into contact with a low-temperature absorbing solution 1005-1, and a low-temperature regenerator 1008-1 that regenerates a low-temperature rich solution 1007-1 that has absorbed $CO_2$, a low-temperature rich-solution supply line 12-1 that feeds the low-temperature rich solution 1007-1 from the low-temperature absorber 1006-1 to the low-temperature regenerator 1008-1, and a low-temperature lean-solution supply line 13-1 that feeds a low-temperature lean solution 1009-1 from which $CO_2$ is reduced in the low-temperature regenerator 1008-1 from the low-temperature regenerator 1008-1 to the low-temperature absorber 1006-1.

Moreover, similarly to the configuration of the low-temperature $CO_2$-reducing apparatus 11-1, the high-temperature $CO_2$-reducing apparatus 11-2 is constituted by a high-temperature absorber 1006-2 that reduces $CO_2$ by bringing the flue gas 1002 into contact with a high-temperature absorbing solution 1005-2, and a high-temperature regenerator 1008-2 that regenerates a high-temperature rich solution 1007-2 that has absorbed $CO_2$, a high-temperature rich-solution supply line 12-2 that feeds the high-temperature rich solution 1007-2 from the high-temperature absorber 1006-2 to the high-temperature regenerator 1008-2, and a high-temperature lean-solution supply line 13-2 that feeds a high-temperature lean solution 1009-2 from which $CO_2$ is reduced in the high-temperature regenerator 1008-2 from the high-temperature regenerator 1008-2 to the high-temperature absorber 1006-2.

Reference numeral 1013-1 refers to a low-temperature heat exchanger that performs heat exchange on the low-temperature rich solution 1007-1 and the low-temperature lean solution 1009-1, and reference numeral 1013-2 refers to a high-temperature heat exchanger that performs heat exchange on the high-temperature rich solution 1007-2 and the high-temperature lean solution 1009-2.

In the $CO_2$ reducing system 10A according to the present embodiment, the low-temperature absorbing solution 1005-1 and the high-temperature absorbing solution 1005-2 are independently supplied to the low-temperature $CO_2$-reducing apparatus 11-1 and the high-temperature $CO_2$-reducing apparatus 11-2, respectively, to be circulated.

Furthermore, in the $CO_2$ reducing system 10A according to the present embodiment, absorption of $CO_2$ and regeneration of the low-temperature absorbing solution 1005-1 and the high-temperature absorbing solution 1005-2 are dependent on the temperature of the low-temperature absorbing solution 1005-1 and the high-temperature absorbing solution 1005-2.

In the present invention, as the low-temperature absorbing solution, for example, methyldiethanolamine (MDEA), diethanolamine (DEA), triethanolamine (TEA), diisopropanolamine (DIPA), 2-amino 2-methylpropanol (AMP), ethyldiethanolamine (EDEA), 2-dimethylaminoethanol (DMAE), 2-diethylaminoethanol (DEAE), and the like can be used. However, the present invention is not limited thereto, and it can be any absorbing solution having high absorption/dissipation property at a low temperature.

Furthermore, in the present invention, as the high-temperature absorbing solution, for example, piperazine (P), monoethanolamine (MEA), 3-amino-1-propanol (AP), 2-methylaminoethanol (MAE), 2-ethylaminoethanol (EAE), n-propylaminoethanol (PAE), 2-methylpiperazine (MP), 1-(2-aminoethyl) piperazine (AEPRZ), and the like can be used. However, the present invention is not limited thereto, and any absorbing solution having high absorption/dissipation property at a high temperature can be used.

Moreover, in the $CO_2$ reducing system 10A according to the present embodiment, the low-temperature absorbing solution 1005-1 and the high-temperature absorbing solution 1005-2 are independently supplied to the low-temperature $CO_2$-reducing apparatus 11-1 and the high-temperature $CO_2$-reducing apparatus 11-2, respectively, and the flue gas 1002 is successively fed in the order of the low-temperature absorbing solution 1005-1 on a low temperature side to the high-temperature absorbing solution 1005-2 on a high temperature side.

By successively feeding the flue gas 1002 in the order of the low-temperature regenerator 1008-1 to the high-temperature regenerator 1008-2, after reducing $CO_2$ included in the flue gas 1002 by the low-temperature absorbing solution 1005-1 on the low temperature side, $CO_2$ that has not been absorbed by the low-temperature absorbing solution 1005-1 is further reduced by the high-temperature absorbing solution 1005-2 on a high temperature side.

Furthermore, in the $CO_2$ reducing system 10A according to the present embodiment, $CO_2$ included in the low-temperature absorbing solution 1005-1 is dissipated in the low-temperature regenerator 1008-1 to regenerate the low-temperature absorbing solution 1005-1. Similarly, $CO_2$ included in the high-temperature absorbing solution 1005-2 is dissipated in the high-temperature regenerator 1008-2 to regenerate the high-temperature absorbing solution 1005-2.

Moreover, if the amount of absorbing solutions are not sufficient to absorb $CO_2$ in the flue gas 1002 at the time when the low-temperature lean solution 1009-1 and the high-temperature lean solution 1009-2 regenerated are fed to the low-temperature absorber 1006-1 and to the high-temperature absorber 1006-2, respectively, deficiency of the low-temperature absorbing solution 1005-1 and the high-temperature absorbing solution 1005-2 are supplied to the low-temperature lean solution 1009-1 and the high-temperature lean solution 1009-2 on the low-temperature lean-solution supply line 13-1 and the high-temperature lean-solution supply line 13-2, respectively.

Figure 8:
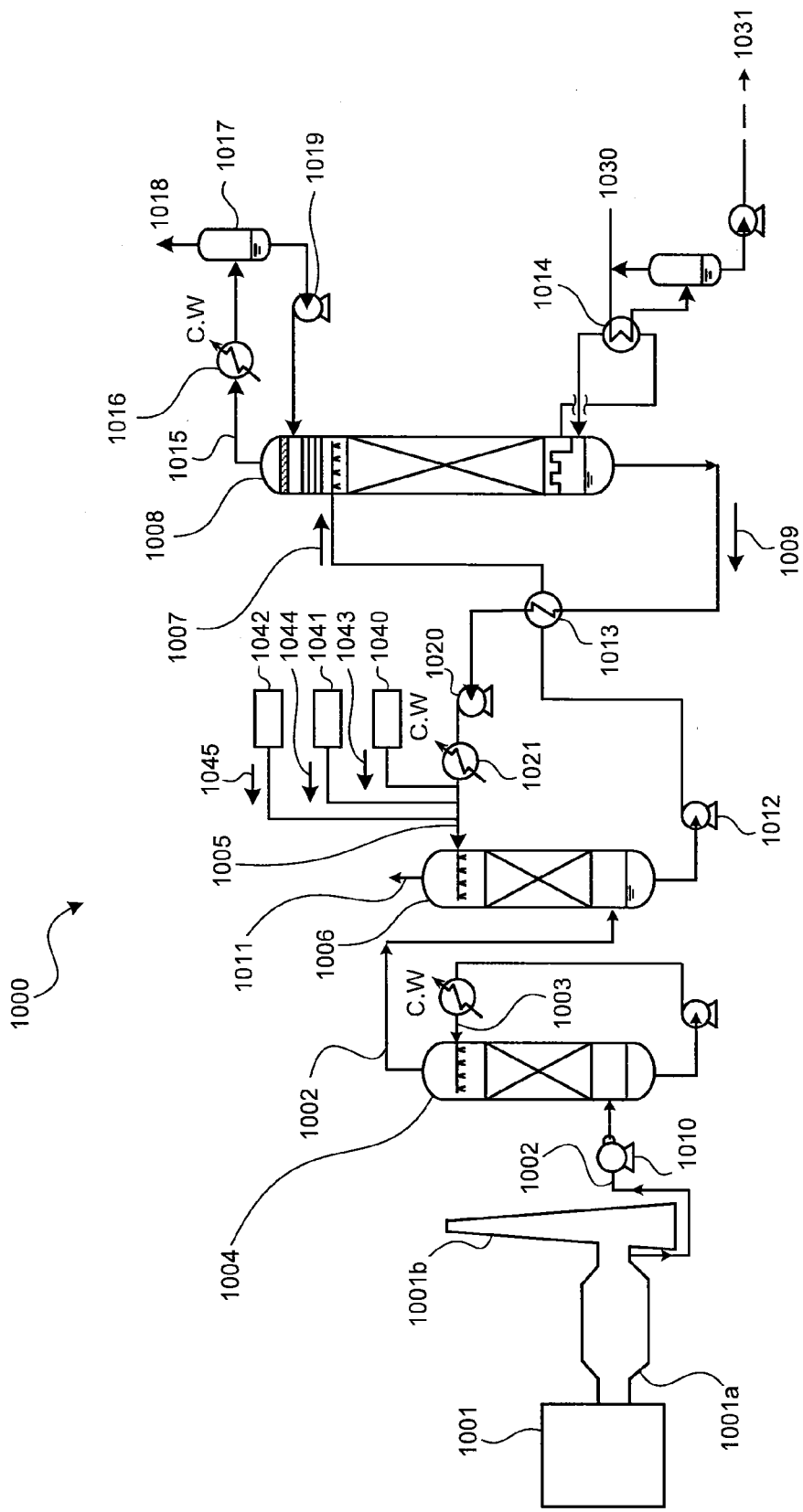
FIG. 8 depicts a concept of a $CO_2$ or $H_2S$ reducing apparatus in which a method of using two kinds of absorbing solutions mixed is adopted.

As described above, according to the $CO_2$ reducing system 10A of the present embodiment, the low-temperature absorbing solution 1005-1 having excellent dissipation property suitable for low temperature absorption and low temperature regeneration, and the high-temperature absorbing solution 1005-2 having excellent absorption property suitable for high temperature absorption and high temperature regeneration are circulated in independent closed systems, respectively, at temperatures suitable for the respective absorption and regeneration. Thus, it is possible to bring out the most of the $CO_2$ absorption/dissipation properties of the respective low-temperature absorbing solution 1005-1 and the high-temperature absorbing solution 1005-2 dependent on the temperature thereof. As a result, $CO_2$ absorption/dissipation can be performed more efficiently than a conventional $CO_2$ reducing apparatus that adopts the method of using two or more kinds of different absorbing solutions mixed as shown in FIG. 8.

Furthermore, in the $CO_2$ reducing system 10A according to the present embodiment, two systems of the low-temperature $CO_2$-reducing apparatus 11-1 and the high-temperature $CO_2$-reducing apparatus 11-2 are provided. However, the present invention is not limited thereto, and three or more systems can be provided, as an arrangement in which the low-temperature $CO_2$-reducing apparatus, a medium-temperature $CO_2$-reducing apparatus, and the high-temperature $CO_2$-reducing apparatus are provided.

Figure 2:
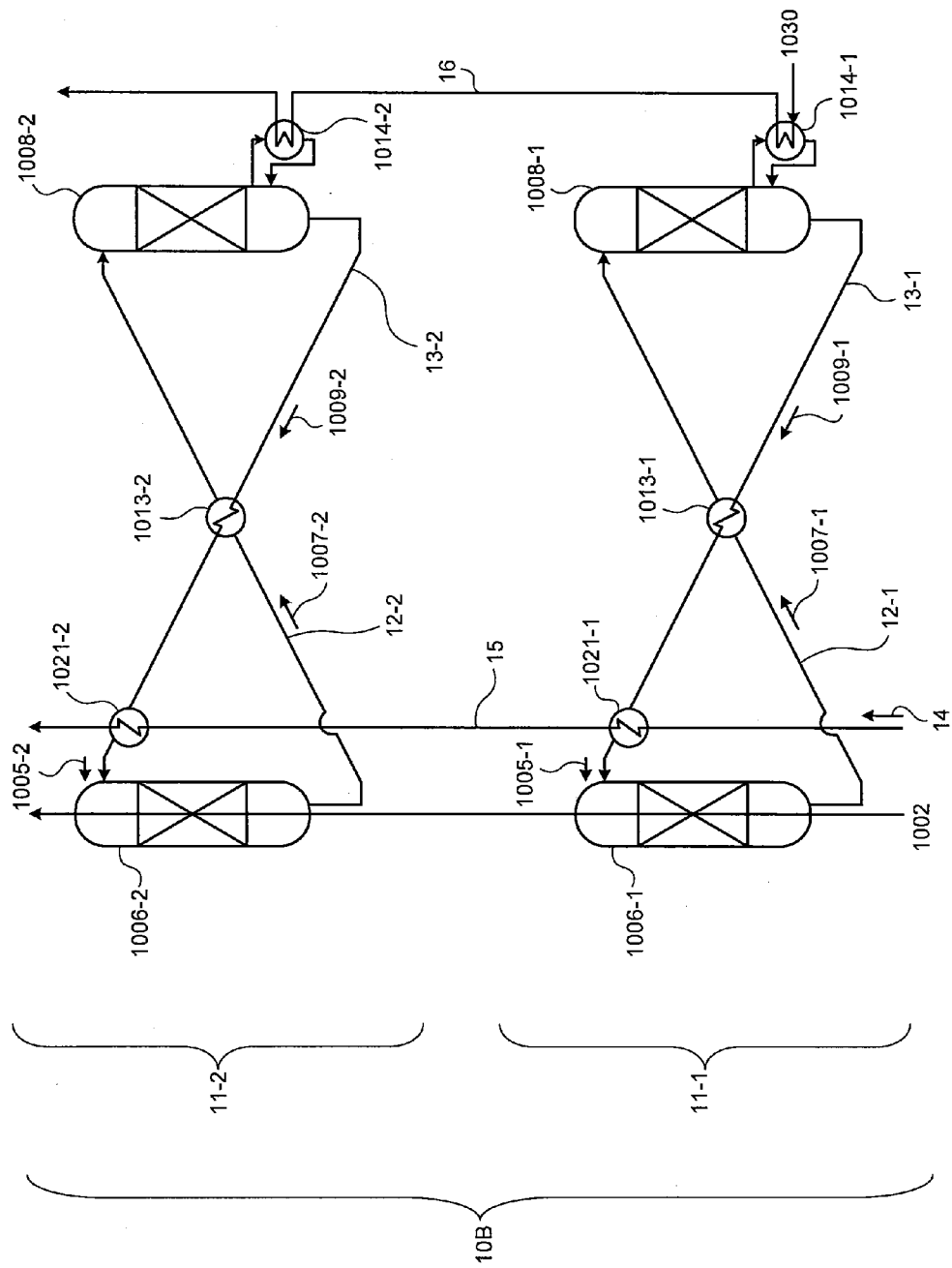
FIG. 2 depicts a modification of the $CO_2$ reducing system according to the first embodiment of the present invention.

Moreover, FIG. 2 depicts a modification of the $CO_2$ reducing system 10A according to the present embodiment shown in FIG. 1. As shown in FIG. 2, a $CO_2$ reducing system 10B according to the present embodiment has a cooling-water supply-line facility that supplies cooling water 14 to cool the respective low-temperature lean solution 1009-1 and high-temperature lean solution 1009-2. While in the $CO_2$ reducing system 10A according to the present embodiment shown in FIG. 1, the cooling water 14 is supplied separately to the low-temperature $CO_2$-reducing apparatus 11-1 and the high-temperature $CO_2$-reducing apparatus 11-2, in the $CO_2$ reducing system 10B according to the present embodiment, this is continuously performed.

The cooling-water supply line facility is formed by arranging a cooling-water supply line 15, and coolers 1021-1 and 1021-2 that interpose the lean solution supply lines in the cooling-water supply line 15.

Specifically, as shown in FIG. 2, the cooling-water supply line 15 that supplies the cooling water 14 to cool down the low-temperature lean solution 1009-1 and the high-temperature lean solution 1009-2 is provided, and the low-temperature lean solution 1009-1 that is supplied from the low-temperature regenerator 1008-1 to the low-temperature absorber 1006-1 is provided at an upstream side, and the high-temperature lean solution 1009-2 that is supplied from the high-temperature regenerator 1008-2 to the high-temperature absorber 1006-2 is provided at a downstream side. In addition, the coolers 1021-1 and 1021-2 are provided interposing the low-temperature lean-solution supply line 13-1 and the high-temperature lean-solution supply line 13-2 in the cooling-water supply line 15.

In the cooler 1021-1, the cooling water 14 that has not been used for heat exchange is used to perform heat exchange to cool the low-temperature lean solution 1009-1 first, and then in the cooler 1021-2, the cooling water 14 whose temperature has increased as a result of the heat exchange is used for heat exchange with the high-temperature lean solution 1009-2 to be cooled.

As described above, by using the low-temperature cooling water 14 that has not been heat exchanged is used for the low-temperature absorbing solution 1005-1 having inferior absorption property, and by using the cooling water 14 whose temperature has increased for the high-temperature absorbing solution 1005-2 having superior absorption property, the low-temperature lean solution 1009-1 and the high-temperature lean solution 1009-2 can be efficiently cooled, respectively.

Moreover, the $CO_2$ reducing system 10B according to the present embodiment has a saturated-steam supply-line facility that feeds saturated steam 1030 that warms up respective low-temperature semi-lean solution 20-1 and high-temperature semi-lean solution 20-2. While in the $CO_2$ reducing system 10A shown in FIG. 1, the saturated steam 1030-1 and 1030-2 are independently fed to the low-temperature $CO_2$-reducing apparatus 11-1 and the high-temperature $CO_2$-reducing apparatus 11-2, respectively, in the $CO_2$ reducing system 10B according to the present embodiment, this is continuously performed.

The saturated-steam supply-line facility is formed by arranging the saturated-steam supply line 16 and regeneration heaters 1014-1 and 1014-2 that interpose the lean-solution supply lines in the saturated-steam supply line 16.

Specifically, as shown in FIG. 2, the saturated-steam supply line 16 that feeds the saturated steam 1030 that warms up the low-temperature lean solution 1009-1 and the high-temperature lean solution 1009-2 is provided, and the low-temperature lean solution 1009-1 that is supplied from the low-temperature regenerator 1008-1 to the low-temperature absorber 1006-1 is provided at an upstream side, and the high-temperature lean solution 1009-2 that is supplied from the high-temperature regenerator 1008-2 to the high-temperature absorber 1006-2 is provided at a downstream side. In addition, the low-temperature regeneration heater 1014-1 and the high-temperature regeneration heater 1014-2 are provided interposing the low-temperature lean-solution supply line 13-1 and the high-temperature lean-solution supply line 13-2 in the saturated-steam supply line 16.

By heating the low-temperature lean solution 1009-1 and the high-temperature lean solution 1009-2 by heat exchange with the saturated steam 1030 in the low-temperature regeneration heater 1014-1 and the high-temperature regeneration heater 1014-2, the steam consumption required for heating the low-temperature lean solution 1009-1 and the high-temperature lean solution 1009-2 can be reduced, and heating can be efficiently performed for each.

Figure 3:
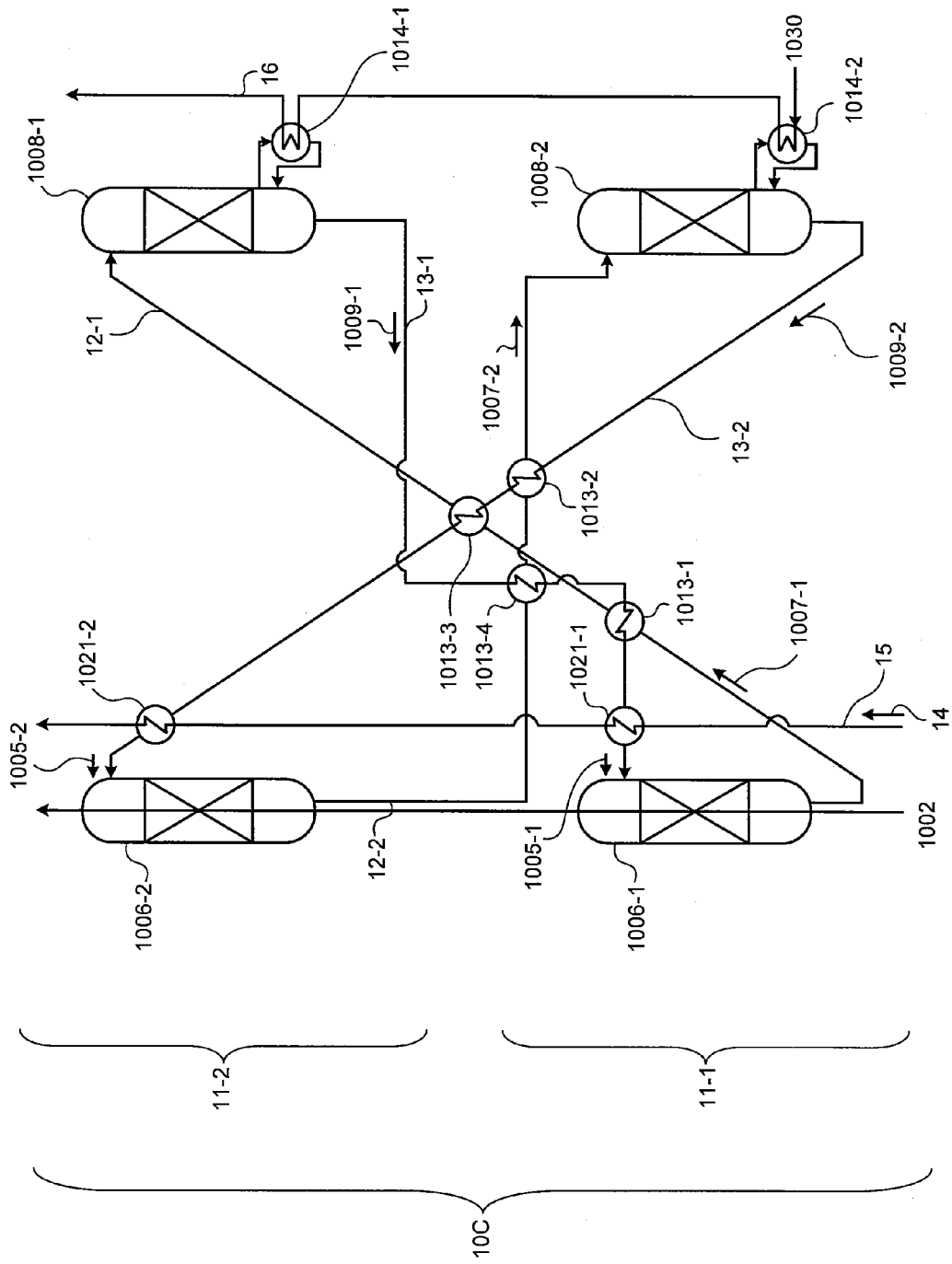
FIG. 3 depicts another modification of the $CO_2$ reducing system according to the first embodiment of the present invention.

Furthermore, FIG. 3 is a modification of the $CO_2$ reducing system 10B according to the present embodiment shown in FIG. 2. As shown in FIG. 3, in a $CO_2$ reducing system 10C according to the present embodiment, the feeding direction of the saturated steam 1030 is opposite to that of the $CO_2$ reducing system 10B according to the present embodiment shown in FIG. 2, and the saturated steam is fed from the high-temperature lean solution 1009-2 side to the low-temperature lean solution 1009-1 side.

The high-temperature saturated steam 1030 that has not been used for heat exchange is used to heat the high-temperature lean solution 1009-2 first in the high-temperature regeneration heater 1014-2, and the saturated steam 1030 whose temperature has decreased as a result of the heat exchange is used to heat the low-temperature lean solution 1009-1 in the low-temperature regeneration heater 1014-1. Thus, the low-temperature lean solution 1009-1 and the high-temperature lean solution 1009-2 can be efficiently heated.

As described above, by using heat of the high-temperature saturated steam 1030 for the high-temperature absorbing solution 1005-2 having inferior dissipation property, and by using heat of the saturated steam 1030 whose temperature has decreased for the low-temperature absorbing solution 1005-1 having superior dissipation property, the heat exchange of the low-temperature absorbing solution 1005-1 and the high-temperature absorbing solution 1005-2 with the saturated steam 1030 can be effectively performed.

Moreover, in the $CO_2$ reducing system 10C according to the present embodiment, a heat exchanger 1013-3 that performs heat exchange on the high-temperature lean solution 1009-2 and the low-temperature rich solution 1007-1, and a heat exchanger 1013-4 that performs heat exchange on the low-temperature lean solution 1009-1 and the high-temperature rich solution 1007-2 are provided.

By performing heat exchange even between the lean solutions and the rich solutions that circulate in separated systems such as the low-temperature $CO_2$-reducing apparatus 11-1 and the high-temperature $CO_2$-reducing apparatus 11-2, the heat exchange of the lean solutions and the rich solutions that circulate in the same system can be performed efficiently.

Figure 4:
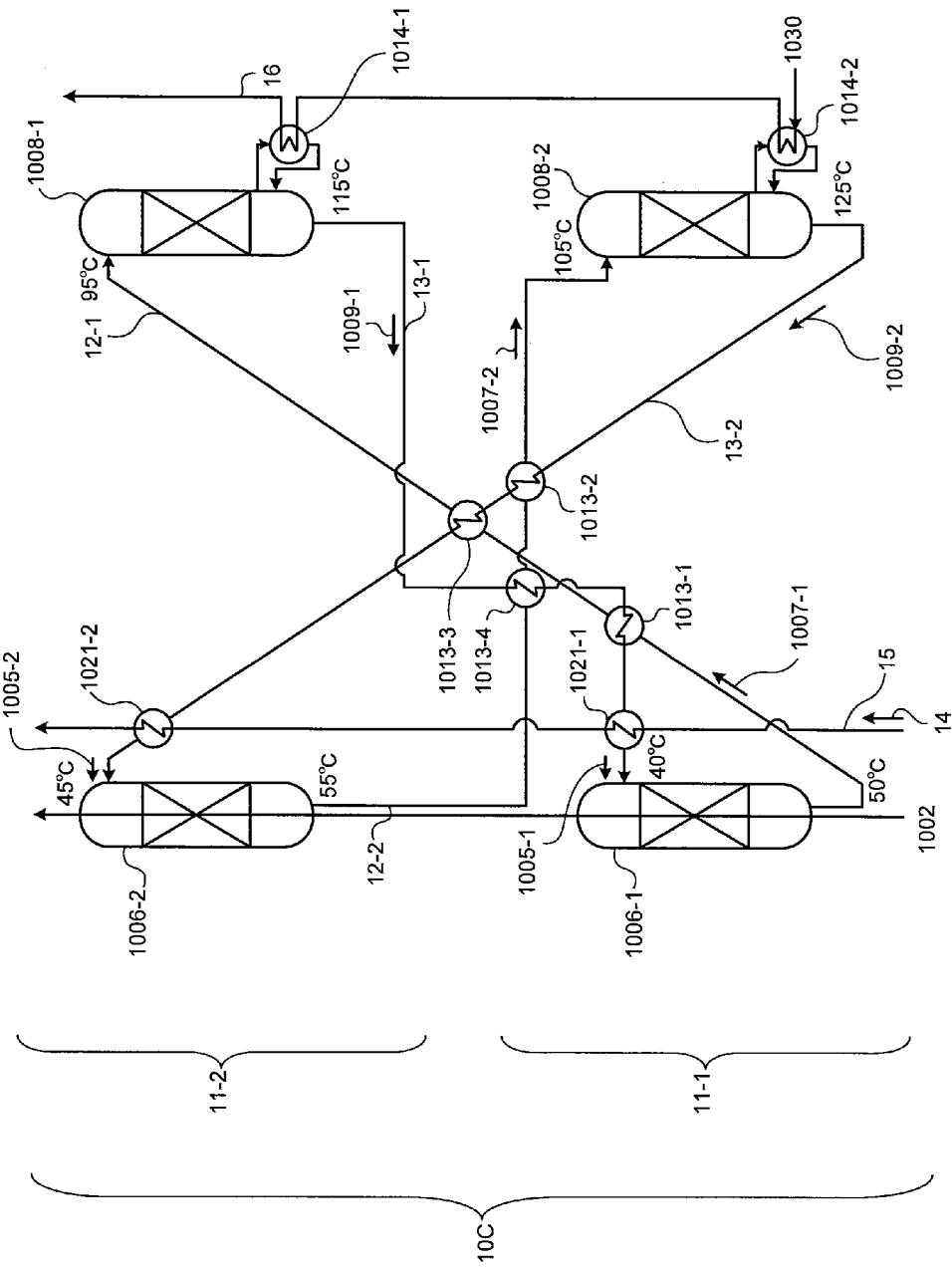
FIG. 4 is an example in which BAE is used as a low-temperature absorbing solution and MAE is used as a high-temperature absorbing solution of the $CO_2$ reducing system according to the first embodiment shown in FIG. 3.

Further, FIG. 4 is an example in which 2-butylaminoethanol (BAE) is used as the low-temperature absorbing solution 1005-1, and 2-methylaminoethanol (MAE) is used as the high-temperature absorbing solution 1005-2 of the $CO_2$ reducing system 10C according to the present embodiment shown in FIG. 3. The temperature of the low-temperature rich solution 1007-1 that is discharged from the low-temperature absorber 1006-1 is, for example, 50° C., the temperature of the low-temperature rich solution 1007-1 that has been heat exchanged in the heat exchangers 1013-1 and 1013-3 and is fed to the low-temperature regenerator 1008-1 is, for example, 95° C., the temperature of the low-temperature lean solution 1009-1 that is discharged from the low-temperature regenerator 1008-1 is, for example, 115° C., and the temperature of the low-temperature lean solution 1009-1 that has been heat exchanged in the heat exchanger 1013-4 and 1013-1 and has been cooled down by the cooler 1021-1 to be fed to the low-temperature absorber 1006-1 is, for example, 40° C.

The temperature of the high-temperature rich solution 1007-2 that is discharged from the high-temperature absorber 1006-2 is, for example, 55° C., the temperature of the high-temperature rich solution 1007-2 that has been heat exchanged in the heat exchangers 1013-4 and 1013-2 and is fed to the high-temperature regenerator 1008-2 is, for example, 105° C., the temperature of the high-temperature lean solution 1009-2 that is discharged from the high-temperature regenerator 1008-2 is, for example, 125° C., and the temperature of the high-temperature lean solution 1009-2 that has been heat exchanged in the heat exchanger 1013-2 and 1013-3 and has been cooled by the cooler 1021-2 to be fed to the high-temperature absorber 1006-2 is, for example, 45° C.

When the $CO_2$ concentration in the provided flue gas 1002 is, for example, 10%, the $CO_2$ concentration in the flue gas 1002 that has passed the low-temperature absorber 1006-1 is, for example, 5%, and the $CO_2$ concentration in the flue gas 1002 that has passed the high-temperature absorber 1006-2 is, for example, 0%.

As described above, according to the $CO_2$ reducing system 10C of the present embodiment, different absorbing solutions are circulated in the respective independent closed systems, the feeding direction of the cooling water 14 and the saturated steam 1030 is determined depending on the temperature dependency of the $CO_2$ absorption/dissipation of the respective absorbing solutions, to perform heat exchange on the rich solutions and the lean solutions that circulate in the $CO_2$ reducing apparatuses with the cooling water 14 and the saturated steam 1030, and further, heat exchange is performed between the rich solutions and the lean solutions that circulate in the same or different $CO_2$ reducing apparatus. Thus, it is possible to bring out the most of the $CO_2$ absorption/dissipation property dependent on the temperature of the respective absorbing solutions. As a result, the $CO_2$ absorption/dissipation can be performed more efficiently than the conventional $CO_2$ or $H_2S$ reducing system that adopts the method of using two or more different absorbing solutions mixed as shown in FIG. 8.

Moreover, because the $CO_2$ absorption/dissipation can be efficiently performed corresponding to the temperature dependency of the respective absorbing solutions in a wide temperature range in the $CO_2$ reducing systems 10A to 10C according to the present embodiment, the saturated steam 1030 and the cooling water 14 that have once been used for the $CO_2$ absorption and dissipation of the respective absorbing solutions can be effectively used, and as a result, energy saving in the entire system can be achieved.

Furthermore, in the $CO_2$ reducing systems 10A to 10C according to the present embodiment, waste of heat at portions at which reaction does not advance sufficiently, such as a high-temperature portion at the middle of the low-temperature absorber 1006-1 and the high-temperature absorber 1006-2, and a low-temperature portion at the upper of the low-temperature regenerator 1008-1 and the high-temperature regenerator 1008-2, can be reduced.

Because a plurality of the low-temperature absorbing solution 1005-1 and the high-temperature absorbing solution 1005-2 that differ in properties such as absorption and dissipation of $CO_2$ or $H_2S$ depending on the temperature of the absorbing solution are used, an applicable range is wider than a single absorbing solution by changing the ratio of solutions or the like, and it is possible to match various conditions such as a condition emphasizing on the cooling water and a condition emphasizing on steam, or condition changes.

While in the $CO_2$ reducing systems 10A to 10C according to the present embodiment, the low-temperature absorbing solution 1005-1 is used for an flue gas with high $CO_2$ concentration, and the high-temperature absorbing solution 1005-2 is used for an flue gas with low $CO_2$ concentration, the present invention is not limited thereto. For example, the high-temperature absorbing solution 1005-2 can be used for an flue gas with high $CO_2$ concentration, and the low-temperature absorbing solution 1005-1 can be used for an flue gas with low $CO_2$ concentration so that $CO_2$ included in the flue gas can be efficiently absorbed.

In a double solution process in which the low-temperature absorbing solution 1005-1 and the high-temperature absorbing solution 1005-2 are independently circulated such as in the $CO_2$ reducing systems 10A to 10C according to the present embodiment, it is not limited to use of heat of the saturated steam 1030 and the cooling water 14, and heat exchange between two solutions of the low-temperature lean solution 1009-1 and the high-temperature lean solution 1009-2, and the low-temperature rich solution 1007-1 and the high-temperature rich solution 1007-2, and for example, a solution having high resistance to $NO_x$, $SO_N$, oxygen, or smoke and dust can be arranged for the low-temperature absorbing solution 1005-1 at the upstream side on the side at which the flue gas 1002 is introduced.

Alternatively, at a downstream side on a side at which the flue gas 1002 is discharged, an absorbing solution having high absorption speed can be used, and at the downstream side on the side at which the flue gas 1002 is discharged, an absorbing solution having low absorption speed can be used.

Further, on the upstream side on the side at which the flue gas is taken in, an absorbing solution having low reaction heat can be circulated so that $CO_2$ in the flue gas is collected with the absorbing solution having as much as possible low reaction heat and the remaining $CO_2$ in the flue gas 1002 can be collected with an absorbing solution having high absorption property, thereby reducing the cost of combustion to generate steam required for absorption and dissipation of $CO_2$ in the flue gas 1002 in the entire system.

While in the $CO_2$ reducing systems 10A to 10C according to the present embodiment, a case that $CO_2$ in the flue gas 1002 is reduced has been explained, the present invention is not limited thereto, and flue gas including $H_2S$, or flue gas including both $CO_2$ and $H_2S$ can be processed.

Furthermore, the $CO_2$ reducing systems 10A to 10C according to the present embodiment are not limited to an apparatus used in a thermal power plant and the like, and the $CO_2$ reducing systems 10A to 10C can be used such as in an ammonia plant.

Moreover, in the $CO_2$ reducing systems 10A to 10C according to the present embodiment, heat exchangers and coolers can be provided appropriately so that heat efficiency is improved corresponding to such as the number of $CO_2$ reducing apparatuses to be provided therein.

[Second Embodiment]

A $CO_2$ reducing system according to a second embodiment of the present invention is explained with reference to the drawings.

Figure 5:
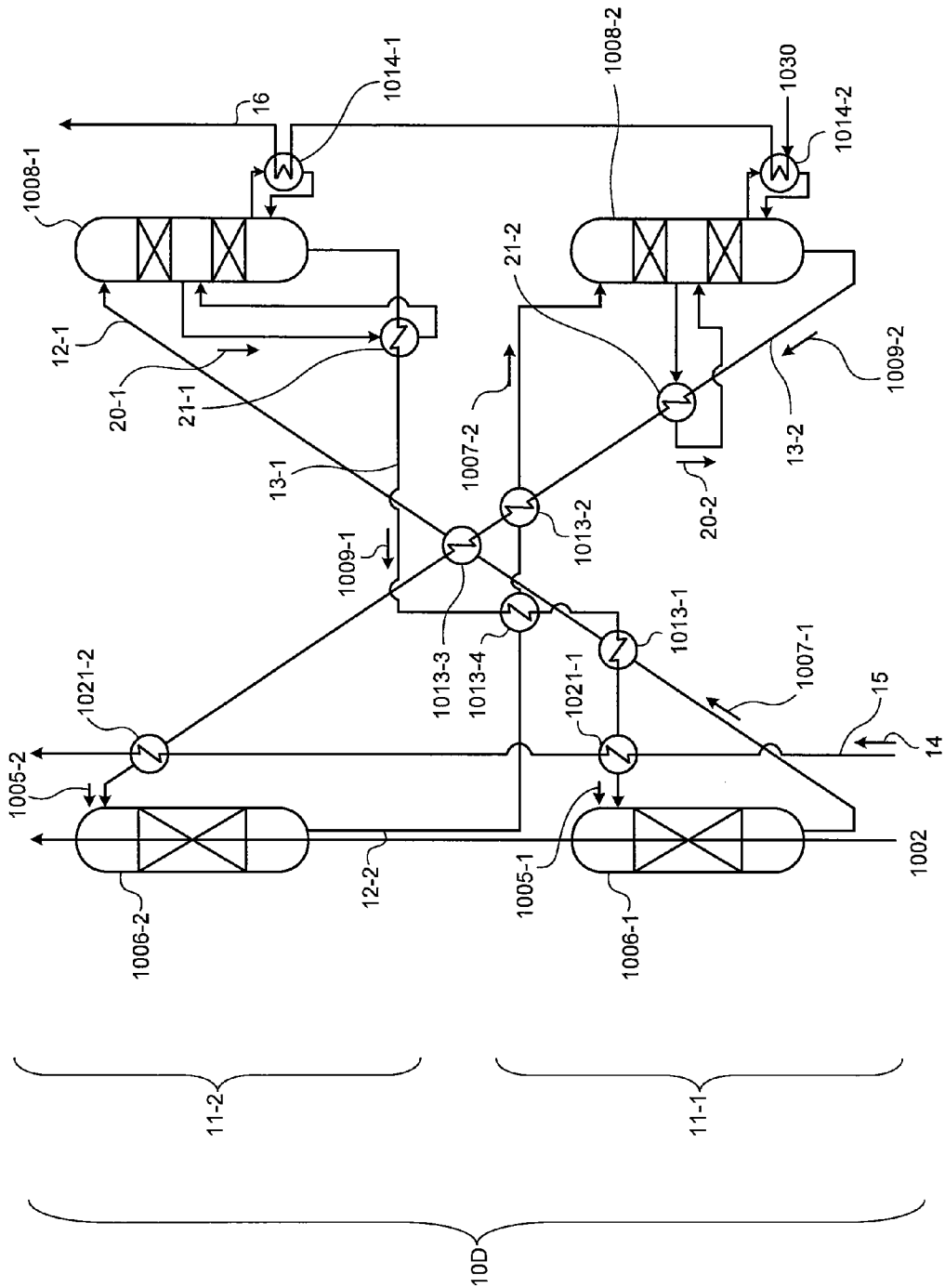
FIG. 5 is a schematic diagram showing a $CO_2$ reducing system according to a second embodiment of the present invention in a simplified manner.

FIG. 5 is a schematic diagram showing the $CO_2$ reducing system according to the present embodiment in a simplified manner. The $CO_2$ reducing system according to the present embodiment has a substantially same configuration as the $CO_2$ reducing systems according to the first embodiment shown in FIGS. 1 to 4, and therefore, like reference numerals refer to like parts to those of the $CO_2$ reducing systems according to the first embodiment shown in FIGS. 1 to 4, and duplicated explanations thereof will be omitted.

AS shown in FIG. 5, a $CO_2$ reducing system 10D according to the present embodiment has a low-temperature semi-lean-solution heat exchanger 21-1 and a high-temperature semi-lean-solution heat exchanger 21-2 that heat the low-temperature semi-lean solution 20-1 and the high-temperature semi-lean solution 20-2 that are extracted from the middle of the low-temperature regenerator 1008-1 and the high-temperature regenerator 1008-2 in $CO_2$ reducing systems 10A to 10C according to the first present embodiment shown in FIGS. 1 to 4 and from which $CO_2$ has been partially removed with the low-temperature lean solution 1009-1 and the high-temperature lean solution 1009-2 that are discharged from the low-temperature regenerator 1008-1 and the high-temperature regenerator 1008-2, respectively. The low-temperature semi-lean-solution heat exchanger 21-1 and the high-temperature semi-lean-solution heat exchanger 21-2 are interposed in the low-temperature lean-solution supply line 13-1 and the high-temperature lean-solution supply line 13-2, respectively.

By heating the low-temperature semi-lean solution 20-1 and the high-temperature semi-lean solution 20-2 that are extracted from the low-temperature regenerator 1008-1 and the high-temperature regenerator 1008-2 by heat exchange with the low-temperature lean solution 1009-1 and the high-temperature lean solution 1009-2, respectively in the low-temperature semi-lean-solution heat exchanger 21-1 and the high-temperature semi-lean-solution heat exchanger 21-2, dissipation of $CO_2$ of the low-temperature semi-lean solution 20-1 and the high-temperature semi-lean solution 20-2 can be effectively achieved.

Figure 6:
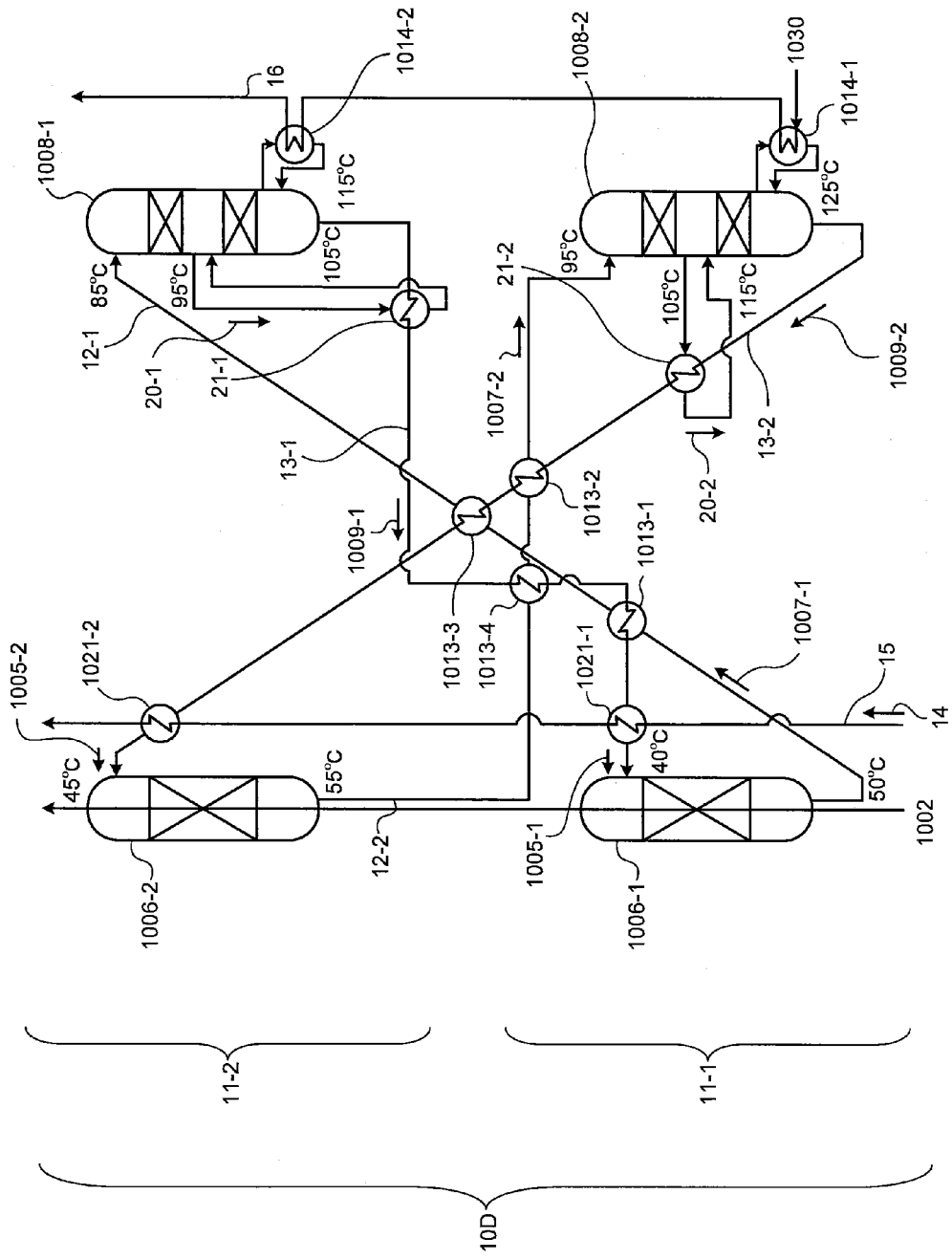
FIG. 6 is an example in which BAE is used as a low-temperature absorbing solution and MAE is used as a high-temperature absorbing solution of the $CO_2$ reducing system according to the second embodiment shown in FIG. 5.

FIG. 6 is an example in which 2-butylaminoethanol (BAE) is used as the low-temperature absorbing solution 1005-1 of the $CO_2$ reducing system 10D according to the present embodiment shown in FIGS. 5, and 2-methylaminoethanol (MAE) is used as the high-temperature absorbing solution 1005-2. The temperature of the low-temperature rich solution 1007-1 that is discharged from the low-temperature absorber 1006-1 is, for example, 50° C., the temperature of the low-temperature rich solution 1007-1 that has been heat exchanged in the heat exchangers 1013-1 and 1013-3 and is fed to the low-temperature regenerator 1008-1 is, for example, 85° C., the temperature of the low-temperature semi-lean solution 20-1 that is extracted from the middle of the low-temperature regenerator 1008-1 is, for example, 95° C., the temperature of the low-temperature semi-lean solution 20-1 that is heat exchanged by the low-temperature semi-lean-solution heat exchanger 21-1 and is fed to the low-temperature regenerator 1008-1 is, for example, 105° C., the temperature of the low-temperature lean solution 1009-1 that is discharged from the low-temperature regenerator 1008-1 is, for example, 115° C., and the temperature of the low-temperature lean solution 1009-1 that has been heat exchanged in the heat exchanger 1013-4 and 1013-1 and has been cooled by the cooler 1021-1 to be fed to the low-temperature absorber 1006-1 is, for example, 40° C.

Moreover, the temperature of the high-temperature rich solution 1007-2 that is discharged from the high-temperature absorber 1006-2 is, for example, 55° C., the temperature of the high-temperature rich solution 1007-2 that has been heat exchanged in the heat exchangers 1013-4 and 1013-2 and is fed to the high-temperature regenerator 1008-2 is, for example, 95° C., the temperature of the high-temperature semi-lean solution 20-2 that is extracted from the middle of the high-temperature regenerator 1008-2 is, for example, 105° C., the temperature of the high-temperature semi-lean solution 20-2 that is heat exchanged by the high-temperature semi-lean-solution heat exchanger 21-2 and is fed to the low-temperature regenerator 1008-2 is, for example, 115° C., the temperature of the high-temperature lean solution 1009-2 that is discharged from the high-temperature regenerator 1008-2 is, for example, 125° C., and the temperature of the high-temperature lean solution 1009-2 that has been heat exchanged in the heat exchanger 1013-2 and 1013-3 and has been cooled by the cooler 1021-2 to be fed to the high-temperature absorber 1006-2 is, for example, 45° C.

When the $CO_2$ concentration of the provided flue gas 1002 is, for example, 10%, the $CO_2$ concentration of the flue gas 1002 that has passed through the low-temperature absorber 1006-1 is, for example, 5%, and the $CO_2$ concentration of the flue gas 1002 that has passed the high-temperature absorber 1006-2 is, for example 0%.

As described above, according to the $CO_2$ reducing system 10D of the present embodiment, the low-temperature semi-lean solution 20-1 and the high-temperature semi-lean solution 20-2 are heat exchanged with the low-temperature lean solution 1009-1 and the high-temperature lean solution 1009-2, respectively, thereby improving the dissipation of $CO_2$ in the low-temperature semi-lean solution 20-1 and the high-temperature semi-lean solution 20-2. In addition, the low-temperature lean solution 1009-1 and the high-temperature lean solution 1009-2 that are fed to the low-temperature absorber 1006-1 and the high-temperature absorber 1006-2, respectively, can be cooled. Therefore, heat exchange can be effectively achieved.

EXAMPLES

Examples that describe effects of the present invention are explained below. The present invention is not limited to the Examples.

In the present example, 40 wt % of 2-methylaminoethanol (MAE) was used as a high-temperature absorbing solution that absorbs $CO_2$ and is regenerated at a high temperature used in the $CO_2$ reducing system 10C according to the present embodiment as shown in FIG. 3, and 50 wt % of 2-butylaminoethanol (BAE) was used as a low-temperature absorbing solution that absorbs $CO_2$ and is regenerated at a low temperature.

Moreover, in the present example, flue gas including 10% of $CO_2$ was used as the flue gas.

Figure 7:
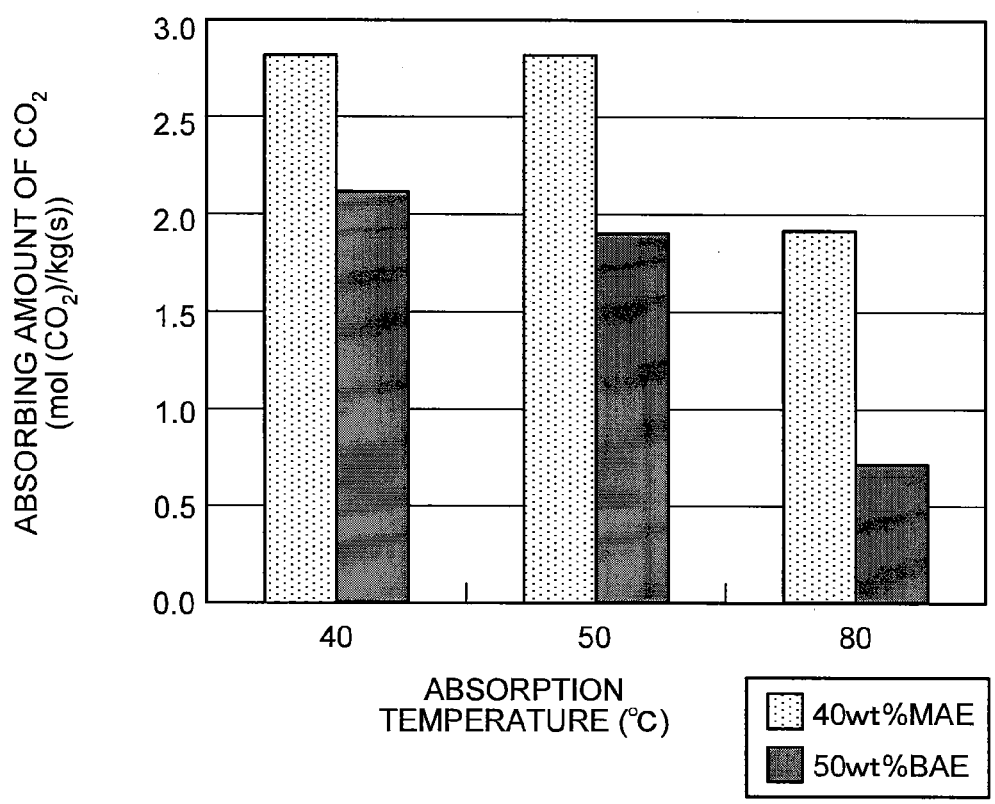
FIG. 7 depicts a relationship between an absorption temperature and an absorbing amount of $CO_2$.

Relation between an absorption temperature of 40 wt % MAE, 50 wt % BAE that are used as absorbing solutions in the present example and an absorbing amount of $CO_2$ from the flue gas is shown in FIG. 7.

As shown in FIG. 7, it was found that 40 wt % MAE can absorb approximately 2.81 mol $CO_2$/kg(s) of $CO_2$ when the absorption temperature is 40° C. Accordingly, it was confirmed that it is an advantageous absorbing solution to reduce a circulating amount for a unit $CO_2$ that circulates in the system by regenerating at a high temperature equal to or higher than 120° C. and by dissipating most of absorbed $CO_2$.

Furthermore, it was found that 40 wt % MAE can absorb approximately 2.75 mol $CO_2$/kg(s) of $CO_2$ when the absorption temperature is 50° C. The difference in $CO_2$ absorbing amount from 40 wt % MAE at 40° C. is only 2.81 mol $CO_2$/kg(s)–2.75 mol $CO_2$/kg(s)=0.06 mol $CO_2$/kg(s), and it was confirmed that even if the cooling water is reduced at the time of cooling 40 wt % MAE with the cooling water and the absorption temperature increases to, for example, 50° C., influence of the reduction of the cooling water is small. From this result, it was confirmed that 40 wt % MAE is a solution that exerts high $CO_2$ absorption property at a high temperature.

It was also found that 40 wt % MAE can absorb approximately 1.92 mol $CO_2$/kg(s) of $CO_2$ when the absorption temperature is 80° C. Therefore, when the absorption temperature of 40 wt % MAE in the absorber is, for example, 40° C., and the solution temperature of the 40 wt % MAE in the regenerator is, for example, 80° C., the amount of $CO_2$ that can be dissipated from the 40 wt % MAE in the regenerator is 2.81 mol $CO_2$/kg(s)–1.92 mol $CO_2$/kg(s)=0.89 mol $CO_2$/kg(s).

At this time, a change in the partial pressure of $CO_2$ at the time of absorption-regeneration of 40 wt % MAE is not taken into consideration.

Therefore, it was found that when the solution temperature of 40 wt % MAE in the regenerator is, for example, 80° C., the $CO_2$ dissipating amount is only approximately 0.89 mol $CO_2$/kg(s). From this finding, it was confirmed that the solution temperature of 40 wt % MAE is required to be high to dissipate most of $CO_2$ that is absorbed by 40 wt % MAE, and 40 wt % MAE is a solution that exerts high $CO_2$ dissipation property at a high temperature.

Therefore, it was confirmed that 40 wt % MAE is a solution that exerts high $CO_2$ absorption/dissipation property at a high temperature, and can be used as a high-temperature absorbing solution.

Furthermore, it was found that 50 wt % BAE can absorb approximately 2.11 mol $CO_2$/kg(s) of $CO_2$ when the absorption temperature is 40° C. Moreover, it was found that 50 wt % BAE can absorb approximately 1.90 mol $CO_2$/kg(s) of $CO_2$ when the absorption temperature is 50° C. The difference in $CO_2$ absorbing amount from 50 wt % BAE at 40° C. is 2.11 mol $CO_2$/kg(s)–1.90 mol $CO_2$/kg(s)=0.21 mol $CO_2$/kg(s). Therefore, it was confirmed that if 50 wt % BAE is used as an absorbing solution, 50 wt % BAE is required to be cooled to 40° C. to increase the $CO_2$ absorbing amount. From this finding, it was confirmed that 50 wt % BAE is a solution that exerts high $CO_2$ absorption property at a low temperature.

Moreover, it was found that 50 wt % BAE can absorb approximately 0.72 mol $CO_2$/kg(s) of $CO_2$ when the absorption temperature is 80° C. When the absorption temperature of the 50 wt % BAE in the absorber is, for example 40° C., and the solution temperature of 50 wt % BAE in the regenerator is, for example, 80° C., the amount of $CO_2$ that can be dissipated from the 50 wt % BAE in the regenerator is 2.11 mol $CO_2$/kg(s)–0.72 mol $CO_2$/kg(s)=1.39 mol $CO_2$/kg(s).

At this time, a change in the partial pressure of $CO_2$ at the time of absorption-regeneration of 50 wt % BAE is not taken into consideration.

Therefore, it was found that when the solution temperature of 50 wt % BAE in the regenerator is, for example, 80° C., the $CO_2$ dissipating amount is approximately 1.39 mol $CO_2$/kg(s). From this finding, it was confirmed that to dissipate most of $CO_2$ that is absorbed by 50 wt % BAE, the solution temperature of 50 wt % BAE can be about 80° C., and heat of about 80° C. that has been conventionally wasted can also be effectively used.

Therefore, it was confirmed that 50 wt % BAE is a solution that exerts high $CO_2$ absorption/dissipation property at a low temperature, and can be used as a low-temperature absorbing solution.

While in the present example, the case that $CO_2$ in flue gas is absorbed and reduced has been explained, the present invention is not limited thereto, and flue gas including another substance such as $H_2S$ can be used.

Industrial Applicability

As described above, the $CO_2$ or $H_2S$ reducing system and the method according to the present invention is suitable for further improving $CO_2$ and/or $H_2S$ absorption efficiency by absorbing $CO_2$ and/or $H_2S$ in flue gas using a plurality of different kinds of absorbing solutions independently.

The invention claimed is:

1. A $CO_2$ or $H_2S$ reducing system comprising:
at least two $CO_2$ or $H_2S$ reducing apparatuses each of which includes an absorber that reduces at least one of $CO_2$ and $H_2S$ by bringing a provided flue gas including at least one of $CO_2$ and $H_2S$ into contact with an absorbing solution, a regenerator that regenerates a rich solution that has absorbed at least one of $CO_2$ and $H_2S$, a rich-solution supply line that feeds the rich solution from the absorber to the regenerator, and a lean-solution supply line that feeds a lean solution from which at least one of $CO_2$ and $H_2S$ are reduced in the regenerator, from the regenerator to the absorber, wherein
the absorbing solution absorbs at least one of $CO_2$ and $H_2S$ and is regenerated depending on a temperature of the absorbing solution, different kinds of absorbing solutions are provided independently to the respective $CO_2$ or $H_2S$ reducing apparatuses, and the flue gas is fed continuously in an order of a low-temperature absorbing solution on a low temperature side to a high-temperature absorbing solution on a high temperature side out of the different kinds of absorbing solutions; and
a saturated-steam supply-line facility that supplies saturated steam to warm the respective lean solutions, wherein
out of lean solutions that are supplied from the regenerator to the absorber, a lean solution having a high temperature is arranged at an upstream side and a lean solution having a low temperature is arranged at a downstream side.

2. The $CO_2$ or $H_2S$ reducing system according to claim 1, further comprising a cooling-water supply-line facility that supplies a cooling water to cool the respective lean solutions, wherein
out of lean solutions that are supplied from the regenerator to the absorber, a lean solution having a high temperature is arranged at an upstream side and a lean solution having a low temperature is arranged on a downstream side.

3. The $CO_2$ or $H_2S$ reducing system according to claim 1, further comprising at least one heat exchanger that performs heat exchange between the lean solution and the rich solution, the lean solution and the rich solution circulating in an identical apparatus or in different apparatuses out of the $CO_2$ or $H_2S$ reducing apparatuses.

4. The $CO_2$ or $H_2S$ reducing system according to claim 1, further comprising at least one semi-lean-solution heat exchanger that is interposed in the lean-solution supply line and that warms a semi-lean solution that is extracted from middle of the regenerator, and from which a part of at least one of $CO_2$ and $H_2S$ is removed, with the lean solution that is discharged from the regenerator.

5. A method of reducing $CO_2$ or $H_2S$, wherein
flue gas including at least one of $CO_2$ and $H_2S$ is fed to a low-temperature absorber, to which a low-temperature absorbing solution on a low-temperature side out of a plurality of different kinds of absorbing solutions is provided, to reduce at least one of $CO_2$ and $H_2S$ in the flue gas by the low-temperature absorbing solution, and then
the flue gas is continuously fed to a high-temperature absorber, to which a high-temperature absorbing solution on a high-temperature side is provided, to further reduce at least one of $CO_2$ and $H_2S$ in the flue gas that has not been removed by the low-temperature absorbing solution, with the high-temperature absorbing solution, wherein
a high-temperature lean solution that is collected near a bottom of a high-temperature regenerator that regenerates a high-temperature rich solution that has absorbed at least one of $CO_2$ and $H_2S$ in the high-temperature absorber is extracted to outside to be heat exchanged with saturated steam, and the warmed high-temperature lean solution is fed to the high-temperature absorber as a high-temperature absorbing solution,
a low-temperature lean solution that is collected near a bottom of a low-temperature regenerator is extracted to outside to be heat exchanged with the saturated steam that has been heat exchanged with the high-temperature lean solution, and the warmed low-temperature lean solution is fed to the low-temperature absorber as a low-temperature absorbing solution, and at least one of $CO_2$ and $H_2S$ in the flue gas are reduced by the low-temperature absorbing solution, and at least one of $CO_2$ and $H_2S$ that has not been removed by the low-temperature absorbing solution is further reduced by the high-temperature absorbing solution.

6. The method of reducing $CO_2$ or $H_2S$ according to claim 5, wherein
the low-temperature absorbing solution that is provided to the low-temperature absorber is cooled by a cooling water, to reduce at least one of $CO_2$ and $H_2S$ in the flue gas by the cooled low-temperature absorbing solution, and then
the high-temperature absorbing solution that is provided to the high-temperature absorber is further cooled using the cooling water that has been heat exchanged with the low-temperature absorbing solution, to further reduce at least one of $CO_2$ and $H_2S$ that has not been removed by the low-temperature absorbing solution, with the high-temperature absorbing solution.

7. The method of reducing $CO_2$ or $H_2S$ according to claim 5, wherein the lean solutions that are discharged from the respective regenerators are heat exchanged using at least one of the rich solutions circulating in an identical apparatus or a different apparatus out of the $CO_2$ or $H_2S$ reducing apparatuses, and the heat exchanged lean solutions are provided to the respective absorbers to reduce at least one of $CO_2$ and $H_2S$ in the flue gas.

8. The method of reducing $CO_2$ or $H_2S$ according to claim 5, wherein the lean solutions that are discharged from the regenerators are additionally heat exchanged with semi-lean solution that are respectively extracted from middle of the regenerators and from which a part of $CO_2$ is removed, and then the heat exchanged lean solutions are respectively provided to the absorbers to reduce at least one of $CO_2$ and $H_2S$ in the flue gas.

* * * * *